United States Patent
Veerabudran et al.

(10) Patent No.: US 12,232,018 B2
(45) Date of Patent: Feb. 18, 2025

(54) UNINTERRUPTED MULTIPLE BASIC SERVICE SET IDENTIFIERS

(71) Applicant: HEWLETT PACKARD ENTERPRISE DEVELOPMENT LP, Houston, TX (US)

(72) Inventors: Subbiah Nagarajan Veerabudran, Santa Clara, CA (US); Andre Beaudin, St. Laurent (CA); Abhiruchi Dakshinkar, Santa Clara, CA (US); Omar El Ferkouss, St. Laurent (CA); Qiang Zhou, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 611 days.

(21) Appl. No.: 17/513,832

(22) Filed: Oct. 28, 2021

(65) Prior Publication Data

US 2023/0132828 A1    May 4, 2023

(51) Int. Cl.
*H04W 48/10*        (2009.01)
*H04L 12/46*         (2006.01)

(52) U.S. Cl.
CPC ......... *H04W 48/10* (2013.01); *H04L 12/4641* (2013.01)

(58) Field of Classification Search
None
See application file for complete search history.

(56) References Cited

U.S. PATENT DOCUMENTS

| 10,237,891 | B1 | 3/2019 | Chu et al. |
| 10,602,430 | B2 | 3/2020 | Chu et al. |
| 11,818,798 | B2* | 11/2023 | Hazarika ............... H04W 76/11 |
| 2019/0174577 | A1 | 6/2019 | Patil et al. |
| 2019/0215884 | A1 | 7/2019 | Paul et al. |
| 2019/0268221 | A1 | 8/2019 | Xiao et al. |
| 2019/0268825 | A1 | 8/2019 | Patil et al. |
| 2019/0268892 | A1 | 8/2019 | Gidvani et al. |
| 2020/0015181 | A1 | 1/2020 | Patil et al. |
| 2020/0120711 | A1 | 4/2020 | Sevin et al. |
| 2022/0060898 | A1* | 2/2022 | Liu ..................... H04W 12/069 |

FOREIGN PATENT DOCUMENTS

WO    WO-20190140412    7/2019

* cited by examiner

*Primary Examiner* — Adolf Dsouza
(74) *Attorney, Agent, or Firm* — Sheppard Mullin Richter & Hampton LLP

(57) ABSTRACT

Systems and methods are provided for generating an MBSSID virtual access point (VAP) to facilitate an uninterrupted MBSSID. An access point (AP) can determine characteristics, or network properties, of VAPs associated with the AP. The AP can generate an MBSSID VAP based on the characteristics of the VAPs. An MBSSID beacon can be generated using the MBSSID VAP as a transmitted VAP (TX VAP) of the MBSSID beacon. The MBSSID VAP serves as a TX-VAP that is not subject to changes and does not need to be interrupted to have changes made to it. As the MBSSID VAP serves as a TX VAP that is not subject to changes or interruptions, the MBSSID based on the MBSSID VAP does not need to be interrupted for changes to be made to other VAPs associated with the MBSSID.

20 Claims, 7 Drawing Sheets

UNINTERRUPTED MULTIPLE BASIC SERVICE SET IDENTIFIERS

BACKGROUND

Today, advances in wireless networking technologies drive technological improvements in other technologies and industries. For example, various industries rely on wireless networking technologies for the communication, storage, and delivery of data and services. In wireless networks, client devices wirelessly connect to a network through an access point (AP). The AP connects to wired resources and facilitates use of the wired resources by the client devices that are wirelessly connected to the AP. Increasing usage of wireless networking technologies, among other factors, creates various technological challenges in the field of wireless networking. The Institute of Electrical and Electronics Engineers (IEEE) has issued various standards, such as the 802.11 standard to address various challenges in the field of wireless networking technologies. Nevertheless, wireless networking technologies continue to face technological challenges as the use of wireless networking technologies increases.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
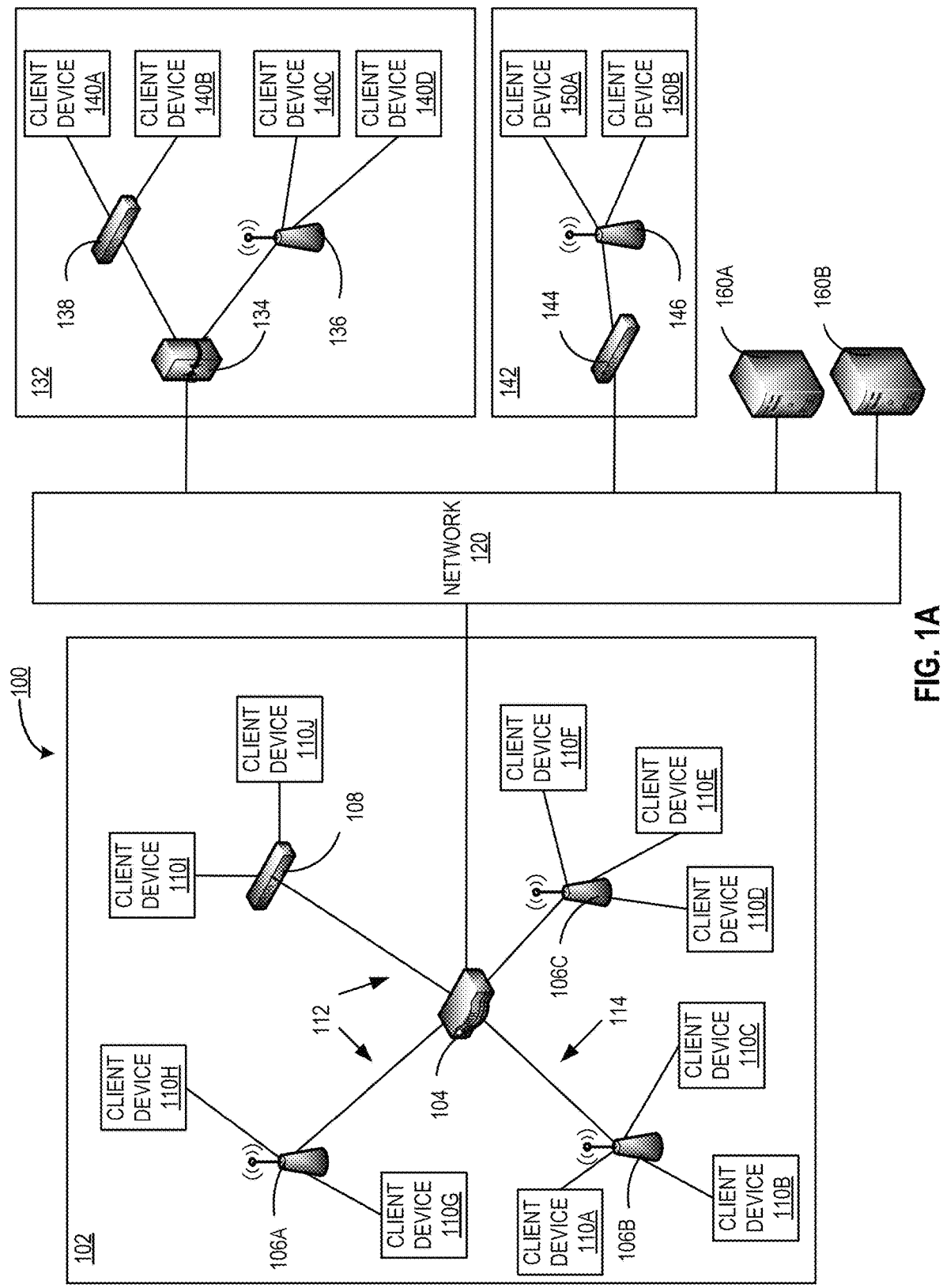
FIG. 1A illustrates one example of a wireless network deployment that may be implemented for an organization, such as a business, educational institution, governmental entity, healthcare facility or other organization.

The figures are not exhaustive and do not limit the present disclosure to the precise form disclosed.

DETAILED DESCRIPTION

As various technologies increasingly rely on wireless networking technologies, there becomes a need to expand the capabilities of wireless networks to accommodate larger numbers of devices with varying configurations. For example, the use of Virtual Access Points (VAPs) allows an Access Point (AP) to present itself as multiple APs. To client devices, a VAP appears as a separate AP. A VAP can be associated with its own set of network properties, such as authentication and encryption, and its set of network properties can be indicated by a Basic Service Set Identifier (BSSID). Thus, each VAP can be associated with a BSSID that indicates a set of network properties associated with the VAP. The AP broadcasts these BSSIDs as beacon frames to announce the presence of the VAPs. The beacon frames are broadcasted to the client devices, which use the BSSIDs associated with the beacon frames to determine a VAP with which to connect. In some deployments, an AP can support multiple wireless networks using multiple VAPs. In these deployments, broadcasting a separate BSSID as a separate beacon frame for each VAP may be inefficient and degrade the connection quality of the wireless networks.

Various approaches to addressing the inefficiencies and network degradation associated with broadcasting separate BSSIDs as separate beacon frames may involve the use of Multiple Basic Service Set Identifiers (MBSSIDs). The use of MBSSIDs generally involves combining multiple BSSIDs associated with VAPs provided by an AP into one MBSSID that the AP broadcasts. Information associated with the multiple BSSIDs is combined into one MBSSID in a manner that allows client devices to determine the network properties for each VAP associated with each BSSID. One approach to the combining of the information associated with the multiple BSSIDs is inheritance. Information associated with one VAP, which in this approach may be referred to as a transmitted VAP (TX VAP), is included in the MBSSID and information associated with other VAPs, which in this approach may be referred to as non-transmitted VAPs (non-TX VAPs) are included in the MBSSID using inheritance. In general, information associated with the non-TX VAPs that are different from the TX VAP (e.g., non-inherited information) is included in the MBSSID. Information associated with the non-TX VAPs that are the same as the TX VAP (e.g., inherited information) is inferred from the information associated with the TX VAP that is included in the MBSSID. Broadcasting an MBSSID allows the AP to use fewer beacon frames than the AP would by broadcasting separate BSSIDs. While the use of MBSSIDs allows APs to efficiently broadcast information associated with multiple BSSIDs, the use of MBSSIDs faces various technological challenges. For example, making changes to a TX-VAP associated with a MBSSID may involve interrupting services for all VAPs associated with the MBSSID as the change is made and the MBSSID is updated. These interruptions may be exacerbated in deployments involving numerous VAPs. Thus, the use of MBSSIDs presents technological challenges arising in the field of wireless networking technology.

Accordingly, disclosed are systems and methods for providing uninterrupted multiple basic service set identifiers (MBSSIDs). In various embodiments, a virtual access point (VAP) can be generated to facilitate an uninterrupted MBSSID. This generated VAP can be referred to, for example, as an MBSSID VAP (or a "ghost" VAP). In some embodiments, an access point (AP) can determine characteristics, or network properties, of VAPs associated with the AP. The AP can generate a VAP (e.g., an MBSSID VAP) based on the characteristics of the VAPs. An MBSSID can be generated using the MBSSID VAP as a transmitted VAP (TX VAP) of the MBSSID. The generated MBSSID VAP can be advertised as a hidden service set identifier (SSID) to dissuade client devices from attempting to connect to the MBSSID VAP. Attempts to connect to the MBSSID VAP can be rejected by the AP. In this way, the MBSSID VAP serves as a TX-VAP that is not subject to changes and does not need to be interrupted to have changes made to it. As the MBSSID VAP serves as a TX VAP that is not subject to changes or interruptions, the MBSSID based on the MBSSID VAP does not need to be interrupted for changes to be made to other VAPs associated with the MBSSID.

For example, a wireless network can include an AP that provides a number of VAPs. The VAPs provided by the AP can be associated with various common characteristics. For example, the VAPs can use a common operating class, a common channel, common channel access functions, and a common radio (or a common antenna connector of a common radio). An MBSSID VAP can be generated based on these common characteristics. For example, the MBSSID VAP can be generated to have the same characteristics as these common characteristics. The basic service set identifier (BSSID) of the MBSSID VAP can include information associated with these common characteristics. An MBSSID can be generated for the VAPs provided by the AP with the BSSID of the MBSSID VAP as the TX VAP of the MBSSID. The MBSSID VAP is not used to communicate with client devices in the wireless network, and attempts to connect to the MBSSID can be rejected. In this example, changes can be made to the VAPs without interruptions to the MBSSID for the VAPs. For example, a change can be made to the characteristics of one of the VAPs provided by the AP. As the change is not made to the TX VAP of the MBSSID, which is the MBSSID VAP, the MBSSID does not need to be interrupted for the change to be made. The AP can continue to advertise the MBSSID with updated information that includes the change made. As illustrated by this example, by generating an MBSSID VAP that is used as a TX VAP of a MBSSID, changes can be made to VAPs advertised by the MBSSID without interruptions. Thus, the disclosed systems and methods addresses technological challenges arising in the field of wireless networking technologies by providing uninterrupted MBSSIDs, as further described herein.

Before describing embodiments of the disclosed systems and methods in detail, it may be useful to describe an example network installation with which these systems and methods might be implemented in various applications. FIG. 1A illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless access points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1A may be, for example, a satellite office, another floor, or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140*a-d*.

In various embodiments, the remote site 132 may be in direct communication with primary site 102, such that client devices 140*a-d* at the remote site 132 access the network resources at the primary site 102 as if these client devices 140*a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a-j*, 140*a-d*, 150*a-b* may request and access the multimedia content provided by the content servers 160*a-b*.

Although only 10 client devices 110*a-j* are illustrated at primary site 102 in the example of FIG. 1A, in various applications, a network may include dramatically larger quantities of client devices. For example, various wireless networks may include hundreds, thousands, or even tens of thousands of client devices communicating with their respective APs, potentially at the same time. Furthermore, multiple virtual access points (VAPs) may be used in these various wireless networks to provide different services to their client devices. For example, VAPs may be used to separate wireless networks of entities sharing a space. The space may use a number of APs to provide wireless connectivity to client devices in the space. Each entity in the space may use their own respective VAPs, supported by the APs, as a way to separate the client devices associated with each entity. The VAPs may be advertised to the client devices in the space with an MBSSID beacon that includes information about the APs. In this example, if changes are made to one of the VAPs, such as the transmitted VAP of the MBSSID beacon, then there is an interruption as changes are made to the MBSSID beacon. This interruption can be very disruptive to the entities in the space as it is generally undesirable for an entity to experience interruptions in service due to the actions of other entities in a shared space. Thus, the use of VAPs and MBSSIDs, without mechanisms to facilitate uninterrupted MBSSIDs, may result in undesirable interruptions in wireless networks. As further described herein, by generating an MBSSID VAP that facilitates uninterrupted MBSSIDs, the disclosed systems and methods provide for improvements to the use of VAPs and MBSSIDs in wireless networks.

Figure 1B:
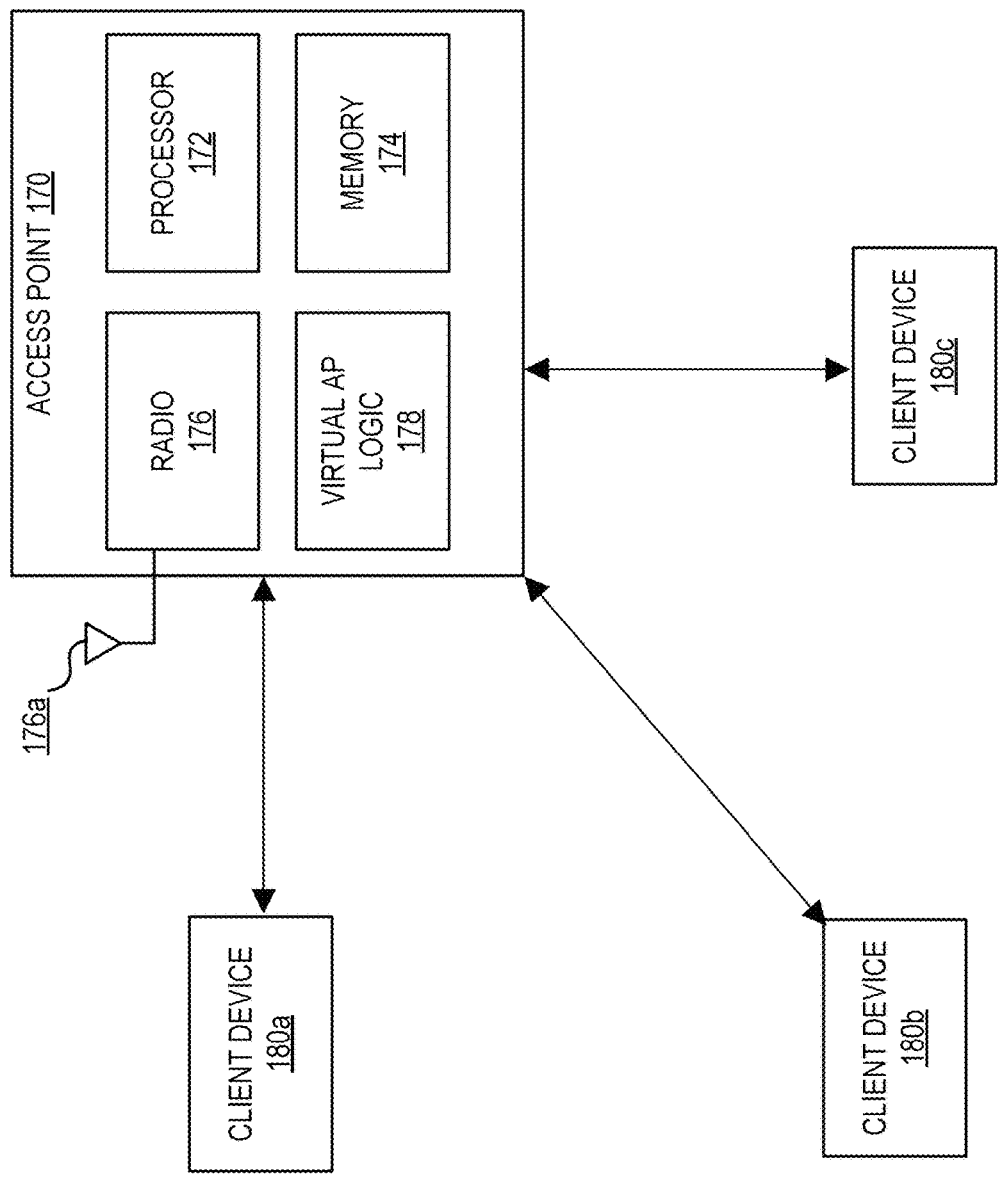
FIG. 1B illustrates an example access point (AP) in which one or more multiple basic service set identifiers (MBSSIDs) for virtual access points (VAPs) may be implemented.

FIG. 1B is a schematic representation of an example access point (AP) 170 in accordance with one embodiment. AP 170 may be a network device that can include, e.g., one or more of: a processor 182, memory/data storage 174, a radio 176 (and corresponding antenna 176*a*), and virtual access point (VAP) logic 178.

Memory 174 may include a fast read-write memory for storing programs and data during the AP 180's operations and a hierarchy of persistent memory such as ROM, EPROM, and Flash memory for storing instructions and data needed for the startup and/or operations of AP 170. Memory 174 may store data that is to be transmitted from AP 170 or data that is received by AP 170. Memory 174 may store one or more of the various parameters (and values thereof) described herein. In some embodiments, memory 174 is a distributed set of data storage components. Although not shown, it should be understood that AP 170 may further include input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces.

Processor 172 is coupled to at least memory 174. Processor 172 may be any processing device including, but not limited to a MIPS-class processor, a microprocessor, a digital signal processor, an application specific integrated circuit, a microcontroller, a state machine, or any type of programmable logic array.

Radio 176 may be a 5 GHZ radio, a 2.4 GHZ radio, a 6 GHz radio, or other appropriate wireless communications component for effectuating wireless communications. Radio 176 may be configured to both transmit and receive data. Radio 176 may facilitate communication with client devices 180*a*, 180*b*, 180*c*. For example, radio 176 may operate on a communication band (e.g., 5.0 GHz UNII band) and operate in accordance with a particular wireless specification (e.g., 802.11ax). It should be understood that AP 170 may have a plurality of radios (physical and/or logical), and may have dedicated or shared channels for each radio or group(s) of radios.

In some embodiments, VAP logic 178 may include one or more functional units implemented using firmware, hardware, software, or a combination thereof for configuring VAPs associated with AP 170 and/or client devices 180*a*, 180*b*, 180*c* for the transmission of data/frames to and from AP 170. Although, VAP logic 178 is shown as being implemented on AP 170, one or more physical or functional components of the prioritization logic 178 may be implemented on a separate device, such as an AP controller, an example of which may be controller 104 of FIG. 1A.

As an illustrative example, VAP logic 178 may implement three VAPs associated with AP 170. Client devices 180*a*, 180*b*, 180*c* may identify the three VAPs as separate APs with different capabilities. Client devices 180*a*, 180*b*, 180*c* may connect to the three VAPs based on these different capabilities. In this example, client device 180*a* may connect to a first VAP, client device 180*b* may connect to a second VAP, and STA 180*c* may connect to a third VAP. In some cases, each VAP may be associated with its own Virtual Local Area Network (VLAN). In these cases, client device 180*a* may be connected to a first VLAN associated with the first VAP, client device 180*b* may be connected to a second VLAN associated with the second VAP, and client device 180*c* may be connected to a third VLAN associated with the third VAP. As client devices 180*a*, 180*b*, 180*c* are connected to different VLANs associated with different VAPs, client devices 180*a*, 180*b*, 180*c* operate as if they are connected to different APs even though they are communicating with AP 170.

In this illustrative example, the AP 170 can advertise the different capabilities (or characteristics) of the three VAPs using a multiple basic service set identifier (MBSSID) beacon. Each of the three VAPs can be associated with their own respective basic service set identifier (BSSID). The MBSSID beacon combines the BSSIDs using inheritance. The MBSSID beacon includes a transmitted BSSID of a transmitted VAP (TX VAP). The transmitted BSSID includes information elements for the characteristics of the TX VAP. The MBSSID also includes non-transmitted BSSIDs of non-transmitted VAPs (non-TX VAPs). The non-transmitted BSSIDs include information elements that indicate which of the characteristics of the transmitted VAP are inherited in the non-transmitted VAPs and which of the characteristics of the transmitted VAP are not inherited in the non-transmitted VAPs. For example, the first VAP of the three VAPs may be used as the TX VAP for the MBSSID beacon. The MBSSID beacon can contain information elements describing the characteristics of the first VAP. The MBSSID beacon can also contain information elements describing the characteristics of the second VAP and the third VAP of the three VAPs using inheritance. For characteristics of the second VAP that are not inherited from the first VAP, information elements can be included in the MBSSID beacon indicating these non-inherited characteristics. For characteristics of the second VAP that are inherited from the first VAP, information elements are not included in the MBSSID beacon for these inherited characteristics. A client device, such as client device 180*b*, can determine these inherited characteristics from the information elements associated with the first VAP, which in this example is the TX VAP. Similarly, for characteristics of the third VAP that are not inherited from the first VAP, information elements can be included in the MBSSID beacon indicating these non-inherited characteristics. For characteristics of the third VAP that are inherited from the first VAP, information elements are not included in the MBSSID beacon for these inherited characteristics. A client device, such as client device 180*c*, can determine these inherited characteristics from the information elements associated with the first VAP, which in this example is the TX VAP.

Figure 2:
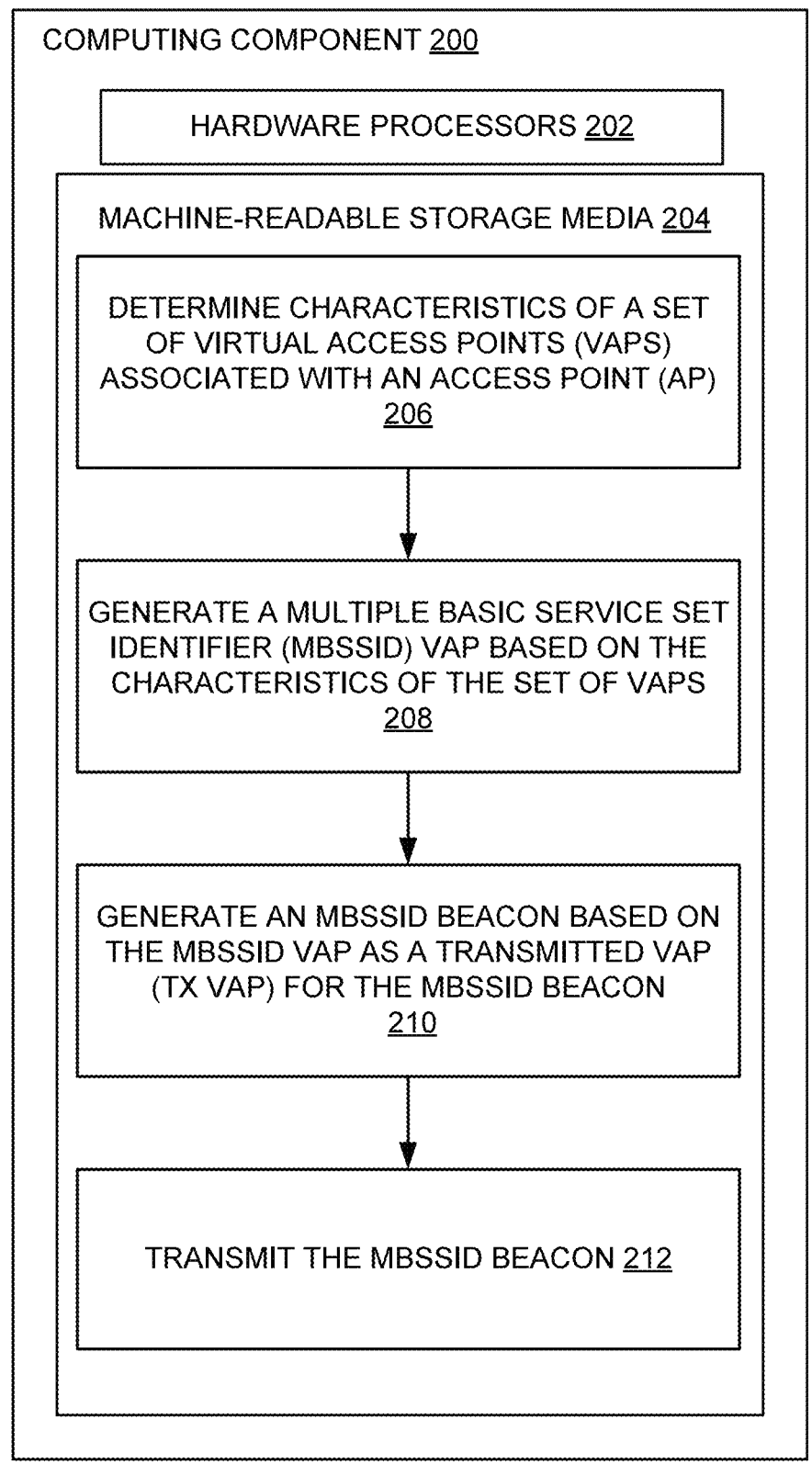
FIG. 2 illustrates a block diagram of an example computing component or device associated with providing uninterrupted MBSSIDs.

FIG. 2 illustrates an example computing component 200 that may be used to implement uninterrupted multiple basic service set identifiers (MBSSIDs) in accordance with various embodiments. The example computing component 200 may be, for example, an access point (AP), a server computer, a controller, or any other similar computing component capable of processing data. In the example implementation of FIG. 2, the computing component 200 includes a hardware processor 202, and machine-readable storage medium 204.

Hardware processor 202 may be one or more central processing units (CPUs), semiconductor-based microprocessors, and/or other hardware devices suitable for retrieval and execution of instructions stored in machine-readable storage medium 204. Hardware processor 202 may fetch, decode, and execute instructions, such as instructions 206-212, to control processes or operations for opportunistic spatial reuse. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 204 may be a non-transitory storage medium, where the term "non-transitory" does not encompass transitory propagating signals. As described in detail below, machine-readable storage medium 204 may be encoded with executable instructions, for example, instructions 206-212.

Hardware processor 202 may execute instruction 206 to determine characteristics of a set of virtual access points (VAPs) associated with an AP. In various embodiments, an AP can provide a number of VAPs, and each VAP can be associated with respective characteristics (e.g., network properties, capabilities). Among these characteristics, there may be some characteristics that are common among the VAPs. For example, characteristics such as operating class, channel, channel access function, antenna connector, radio, medium access control (MAC) capabilities, physical layer capabilities, and the like may be likely to be common among VAPs associated with an AP. Further, various radio specific characteristics, such as country, spatial reuse capabilities, high efficiency capabilities, band capabilities, and the like may be likely to be common among the VAPs associated with the AP. Other characteristics, such as dot11 protocol capabilities, may be less likely to be common among the VAPs associated with the AP. An MBSSID beacon can be used to advertise the characteristics of the VAPs associated with an AP. For the MBSSID beacon to efficiently advertise the characteristics of the VAPs associated with the AP, a VAP that has more common characteristics than other VAPs associated with the AP can be selected as the transmitted VAP (TX VAP). Using a TX VAP that has more common characteristics allows the MBSSID to efficiently use inheritance to describe the characteristics of the other VAPs. For generating an MBSSID VAP to facilitate uninterrupted MBSSIDs, the MBSSID VAP can be generated based on the common characteristics of the VAPs associated with an AP.

For example, a wireless network, such as the network configuration illustrated in FIG. 1A, can include an AP that provides a number of VAPs. The VAPs provided by the AP can be associated with respective characteristics, some common among all the VAPs, and some unique to each VAP. Based on the characteristics associated with each VAP, a set of common characteristics for the VAPs can be determined. In this example, the VAPs can be associated with the same channel and the same channel access functions. Additionally, the VAPs can share radio specific characteristics because they are provided by the same AP. In this example, the VAPs can be associated with the same HE capabilities, and the same spatial reuse capabilities. An MBSSID VAP to facilitate uninterrupted MBSSIDs can be generated based on these common characteristics.

Hardware processor 202 may execute instruction 208 to generate an MBSSID VAP based on the characteristics of the set of VAPs. In various embodiments, an MBSSID VAP can be generated based on the common characteristics of a set of VAPs. By generating the MBSSID VAP based on the common characteristics of the set of VAPs, an MBSSID beacon using the MBSSID VAP as a TX VAP can efficiently utilize inheritance to reduce the beacon size of the MBSSID beacon. Furthermore, the MBSSID VAP can be generated to only carry the common characteristics of the set of VAPs and carry no characteristics that are unique from the set of VAPs. For example, the MBSSID VAP can be generated to only carry radio specific characteristics that are common to all VAPs. As the MBSSID VAP is generated to facilitate an uninterrupted MBSSID, and not to facilitate communication with client devices, the MBSSID VAP can be generated with what may be considered an incomplete set of characteristics. By generating the MBSSID VAP to only carry the common characteristics of the set of VAPs, the MBSSID VAP has a reduced impact on the beacon size of the resulting MBSSID beacon using the MBSSID VAP as a TX VAP because the MBSSID VAP does not carry characteristics that are not inherited by the other VAPs associated with the MBSSID beacon. Furthermore, as the MBSSID VAP is generated to facilitate an uninterrupted MBSSID, and not to facilitate communication with client devices, the MBSSID VAP can be generated to dissuade connections from client devices. The MBSSID VAP can be generated with a hidden service set identifier (SSID) or the MBSSID VAP can be generated with a nameless SSID of zero length. To ensure that client devices do not connect with the MBSSID VAP, an AP associated with the MBSSID VAP can reject connection attempts by any client devices that try to connect with the MBSSID VAP. Additionally, or alternatively, the AP associated with the MBSSID VAP can ignore or prevent responding to unicast and/or broadcast probe requests for the MBSSID VAP. Connection attempts by client devices can be rejected by sending an authentication response carrying an error status or failure status or by sending an association response carrying an error status or failure status.

For example, a wireless network, such as the network configuration illustrated in FIG. 1A, can include an AP that provides a number of VAPs. An MBSSID VAP to facilitate uninterrupted MBSSIDs can be generated based on common characteristics of the VAPs. For example, the VAPs can be associated with the same operating class, the same channel, and the same channel access functions. The MBSSID VAP can be generated to only have these common characteristics. Other characteristics, which may vary from VAP to VAP, such as dot11 protocol capabilities, are not included in the characteristics of the MBSSID VAP. Additionally, the MBSSID VAP can be generated with a nameless SSID of zero length to dissuade client devices from attempting to connect to the MBSSID VAP. An MBSSID beacon can be generated using the MBSSID VAP as a TX VAP.

Hardware processor 202 may execute instruction 210 to generate an MBSSID beacon based on the MBSSID VAP as a transmitted VAP (TX VAP) for the MBSSID beacon. In various embodiments, an MBSSID VAP can facilitate uninterrupted MBSSIDs by functioning as a TX VAP of an MBSSID beacon. The MBSSID beacon can include information elements describing characteristics of the TX VAP. The MBSSID beacon can include information elements describing characteristics of non-TX VAPs. The characteristics of the non-TX VAPs are included using inheritance. That is, where the non-TX VAPs associated with an MBSSID share the same characteristics as the TX VAP associated with the MBSSID, those characteristics are described in the information elements associated with the TX VAP and not in the information elements associated with the non-TX VAPs. When the MBSSID beacon is received by a client device, or other network device, the characteristics of the non-TX VAPs that are shared with the TX VAP are determined based on the information elements associated with the TX VAP and a lack of information elements describing these characteristics associated with the non-TX VAPs. On the other hand, where the non-TX VAPs associated with an MBSSID have different characteristics from the TX VAP associated with the MBSSID, those characteristics are described in information elements associated with the non-TX VAPs. When the MBSSID beacon is received by a client device, or other network device, the characteristics of the non-TX VAPs that are different from the TX VAP are determined based on the information elements associated with the non-TX VAPs. Various information, including characteristics, that are generally common across VAPs associated with an AP can be included in the information elements associated with a TX VAP of an MBSSID beacon. This information can include, for example, operating class, channel, channel access functions, antenna connector, radio, MAC capabilities, PHY capabilities, timestamp and beacon intervals, traffic indication map (TIM), direct-sequence spread spectrum (DSSS) parameters, independent basic service set (IBSS) parameters, country, channel switch announcements, extended channel switch announcements, wide bandwidth channel switches, transmit power envelope, supported operating classes, high throughput (HT) capabilities, very high throughput (VHT) capabilities, S1G beacon capabilities, short beacon intervals, HE capabilities, basic service set (BSS) color change announcements, spatial reuse parameters, and the like.

For example, a wireless network, such as the network configuration illustrated in FIG. 1A, can include an AP that provides a number of VAPs. An MBSSID VAP to facilitate uninterrupted MBSSIDs can be generated based on common characteristics of the VAPs. An MBSSID beacon can be generated using the MBSSID VAP as a TX VAP. The MBSSID beacon can include information elements describing the common characteristics, which in this example are the operating class, channel, and channel access functions, of the TX VAP. The MBSSID beacon can include information elements describing the different characteristics associated with the other VAPs provided by the AP, which are the non-TX VAPs associated with the MBSSID. For example, the MBSSID beacon can include information elements associated with the non-TX VAPs describing the varying dot11 protocol capabilities of the other VAPs. The MBSSID beacon generated from the MBSSID VAP and the VAPs provided by the AP can be transmitted to advertise the capabilities of the different VAPs.

Hardware processor 202 may execute instruction 212 to transmit the MBSSID beacon. In various embodiments, an AP broadcasts an MBSSID beacon in one or more beacon frames. The MBSSID beacon can be broadcasted at regular beacon intervals. The beacon intervals can be adjusted and vary depending on various factors. In general, a higher beacon interval can use less communication throughput from the AP than a lower beacon interval. A higher beacon interval may also cause a slower delivery of an MBSSID than a lower beacon interval in cases where the MBSSID spans multiple beacon frames. In cases where an MBSSID spans multiple beacon frames, the BSSID for a specific VAP is available once every p beacon intervals, where p is the profile periodicity.

For example, a wireless network, such as the network configuration illustrated in FIG. 1A, can include an AP that provides a number of VAPs. An MBSSID beacon can be generated using a MBSSID VAP based on common characteristics of the VAPs. The MBSSID beacon generated from the MBSSID VAP and the VAPs provided by the AP can be transmitted to advertise the capabilities of the different VAPs. For example, the AP can broadcast the MBSSID beacon at regular beacon intervals. In this example, a change can be made to one of the VAPs (other than the MBSSID VAP) provided by the AP. As the change is not made to the TX VAP of the MBSSID, the MBSSID is not interrupted to implement the change, and the AP can continue to broadcast the MBSSID beacon at regular beacon intervals. Further, no client devices need to be dropped from the MBSSID due to the interruption. Thus, as described herein, the use of an MBSSID VAP to facilitate uninterrupted MBSSIDs avoids disruptions to wireless networks resulting from changes made to a VAP provided by an AP.

Figure 3:
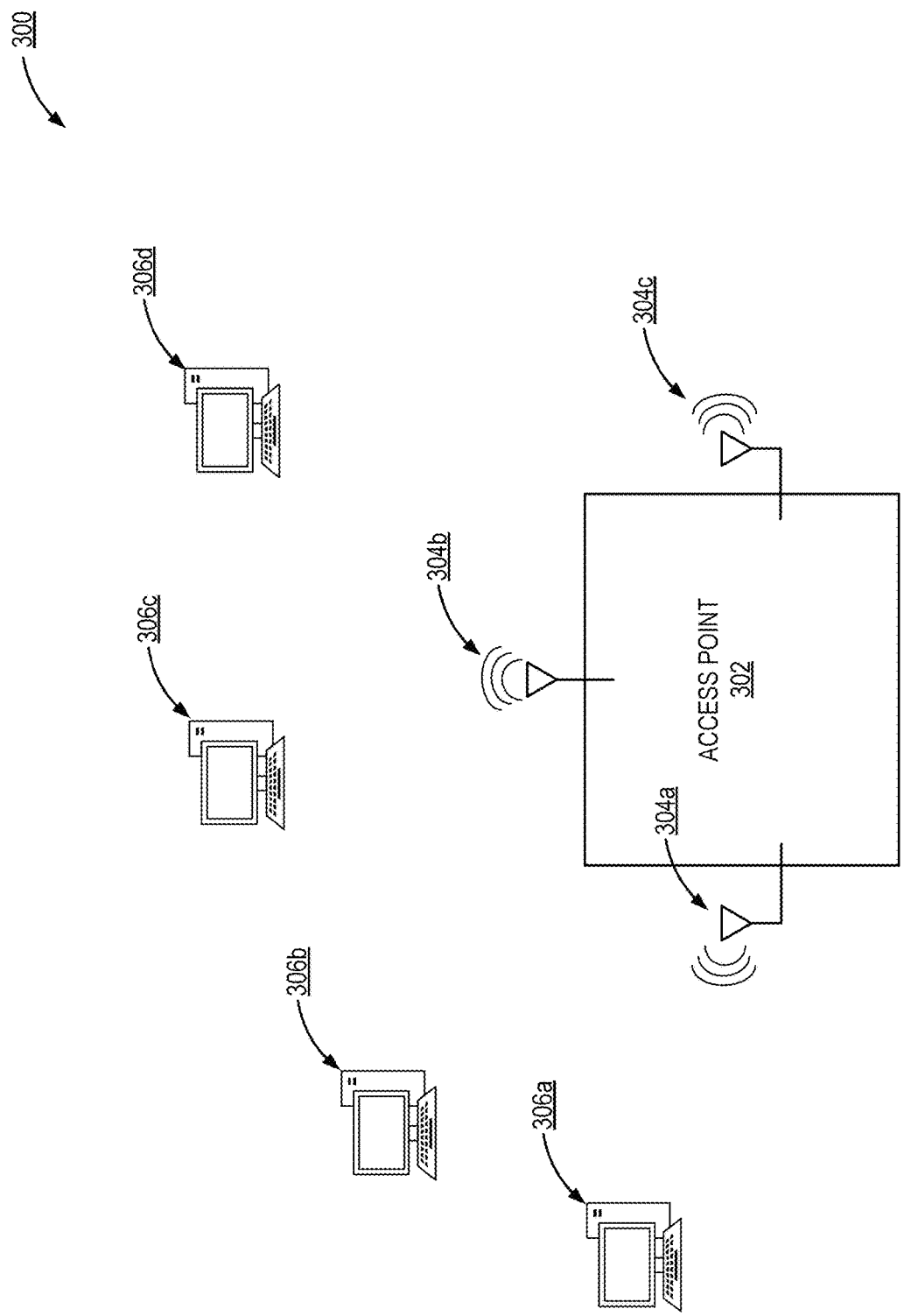
FIG. 3 illustrates an example wireless deployment associated with providing uninterrupted MBSSIDs.

FIG. 3 illustrates an example wireless deployment 300 associated with providing uninterrupted multiple basic service set identifiers (MBSSIDs). The example wireless deployment 300 can be associated with one or more functions performed by, for example, the example computing component 200 of FIG. 2. It should be understood that there can be additional, fewer, or alternative steps performed in similar or alternative orders, or in parallel, based on the various features and embodiments discussed herein unless otherwise stated.

As illustrated in FIG. 3, the example wireless deployment 300 includes an access point (AP) 302. The example wireless deployment 300 also includes four client devices 306a-306d. The AP 302 can provide a number of virtual access points (VAPs). For example, the AP 302 may support up to a total of sixteen VAPs, and the AP 302 can provide up to fifteen VAPs while reserving one VAP to serve as an MBSSID VAP. As illustrated in FIG. 3, the AP 302 can have multiple radios. While this example illustrates three radios 304a-304c, other numbers of radios are possible. In some cases, an AP can have a number of radios where some of the radios support MBSSID while the other radios do not support MBSSID. For example, radio 304c of the AP 302 may support MBSSID while radios 304a-304b of the AP 302 do not support MBSSID. In this example, an MBSSID VAP that is generated would be included in an MBSSID beacon broadcast by radio 304c.

As an illustrative example, the AP 302 can provide four VAPs to the client devices 306a-306d. For example, the client devices 306a-306d can each be associated with a different entity in a shared space. The four VAPs allows the client devices 306a-306d to access the respective resources associated with the different entities through the AP 302. The AP 302 can broadcast an MBSSID beacon to advertise the capabilities of the four VAPs. As the client devices 306a-306d and the VAPs are associated with different entities, the VAPs may be maintained by different administrators. Further, if one of the administrators makes a change to the VAP the administrator is maintaining, the change may cause the other VAPs to be interrupted in order for the AP to implement the change and update the MBSSID. To address this challenge, an MBSSID VAP can be generated to facilitate uninterrupted MBSSIDs. The MBSSID VAP can be generated to have the characteristics that are common to the four VAPs. For example, the four VAPs can be associated with the same operating class, the same channel, and the same channel access functions. The MBSSID VAP can be generated to only have these common characteristics. The MBSSID VAP can be generated with a nameless SSID of zero length to dissuade client devices, such as client devices 306a-306d, from attempting to connect to the MBSSID VAP. Further, the AP 302 can reject any attempts to connect to the MBSSID VAP. The MBSSID beacon broadcasted by the AP 302 can be based on the MBSSID VAP with the MBSSID VAP as the transmitted VAP (TX VAP) of the MBSSID beacon. The MBSSID beacon can include information associated with the four VAPs as non-transmitted VAPs (non-TX VAPs). In this way, the MBSSID VAP serves as a TX-VAP that is not subject to changes and the MBSSID does not need to be interrupted to make changes to the other VAPs. Thus, if one of the administrators makes a change to the VAP the administrator is maintaining, the change does not require the other VAPs to be interrupted in order for the AP to implement the change and update the MBSSID.

Figure 4A:
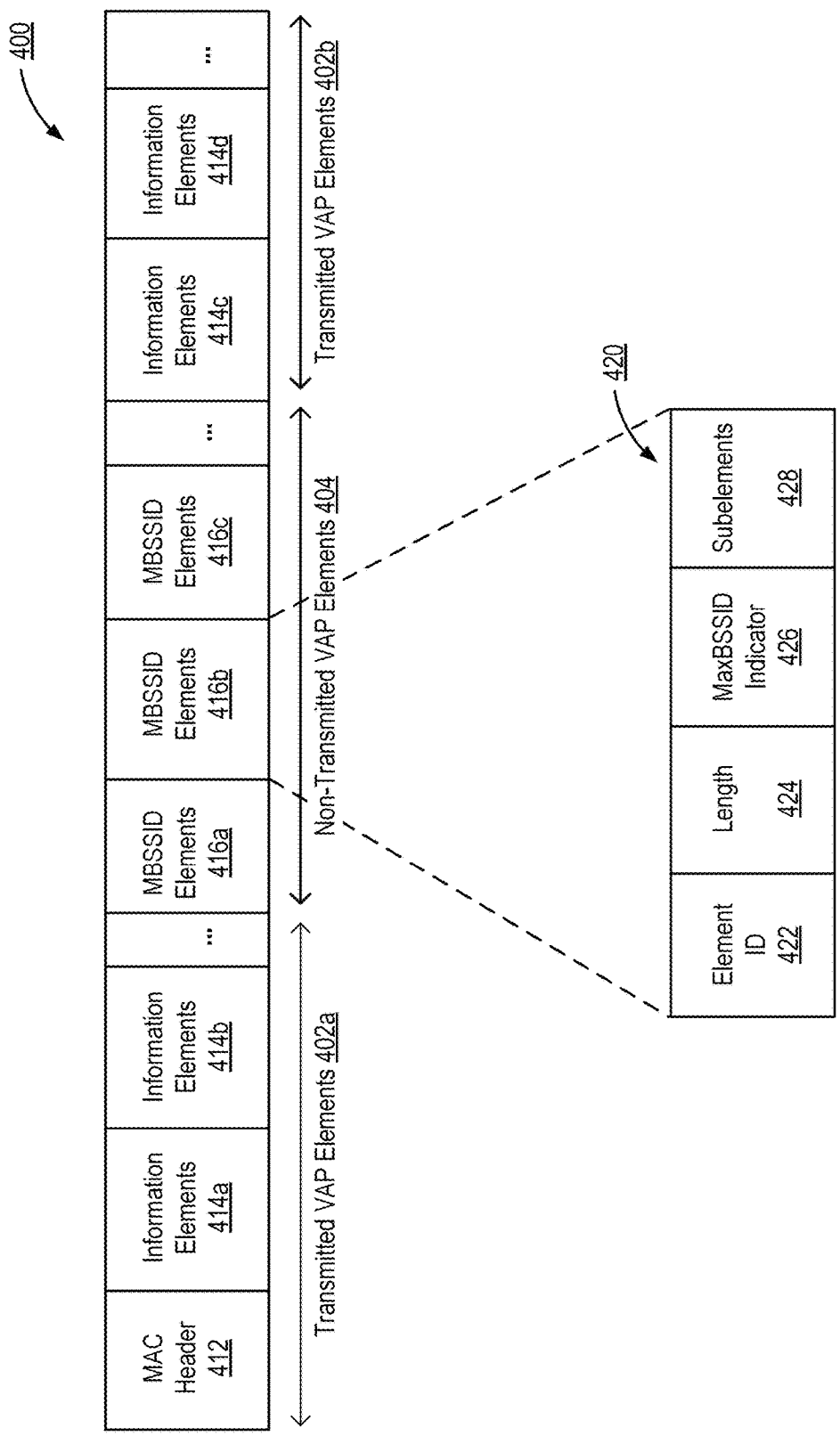
FIG. 4A illustrates an example MBSSID beacon and an example MBSSID element.

FIG. 4A depicts a block diagram of an example multiple basic service set identifier (MBSSID) beacon 400 and a block diagram of an example MBSSID element 420, in accordance with various embodiments. In this example, MBSSID beacon 400 can include an MBSSID for virtual access points (VAPs) provided by an access point (AP). The MBSSID combines the BSSIDs of the VAPs by providing elements describing a transmitted VAP (TX VAP) and elements describing non-transmitted VAPs (non-TX VAPs) in terms of what is inherited or not inherited from the TX VAP. In this example, the MBSSID beacon 400 can include TX VAP elements 402a, 402b and non-TX VAP elements 404. TX VAP elements 402a, 402b can include information elements associated with a TX VAP in the MBSSID beacon. The MAC header 412 can correspond to the MAC header of the TX VAP. The information elements 414a, 414b, 414c, 414d can include various characteristics of the TX VAP. The non-TX VAP elements 404 can include MBSSID elements 416a, 416b, 416c associated with non-TX VAPs. MBSSID elements 416a, 416b, 416c can include various characteristics of the non-TX VAPs. The MBSSID elements 416a, 416b, 416c describe the characteristics of the non-TX VAPs in terms of what is inherited and not inherited from the characteristics of the transmitted VAP, as provided in information elements 414a, 414b, 414c, 414d.

As illustrated in FIG. 4A, MBSSID element 420 can be implemented as MBSSID elements 416a, 416b, 416c in MBSSID beacon 400. In this example, MBSSID element 420 can include element ID 422, length 424, MaxBSSID indicator 426, and subelements 428. Element ID 422 provides the ID of MBSSID element 420. Length 424 provides the length of MBSSID element 420. MaxBSSID indicator 426 provides the maximum number of supported BSSIDs. Subelements 428 provide the characteristics of the non-TX VAP corresponding to element ID 422. In this example, element ID 422, length 424, and MaxBSSID indicator 426 are octets, and subelements 428 has variable length.

Figure 4B:
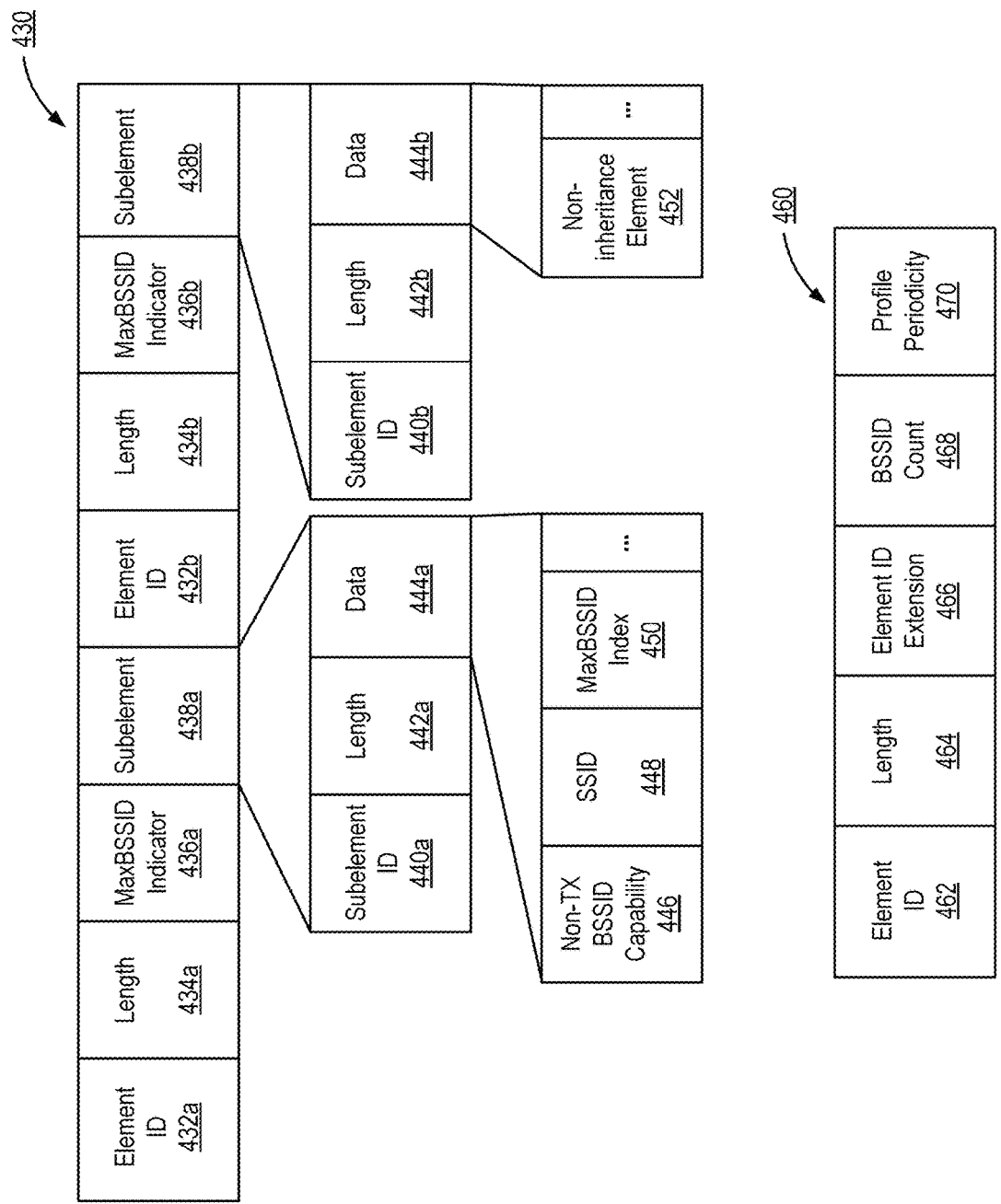
FIG. 4B illustrates example MBSSID elements.

FIG. 4B depicts a block diagram of two example MBSSID elements 430 and a block diagram of an example MBSSID config element 460, in accordance with various embodiments. In this example, MBSSID elements 430 includes two MBSSID elements. The two MBSSID elements can be a part of an MBSSID beacon, such as the MBSSID beacon 400 of FIG. 4A. Element IDs 432a, 432b that provides the IDs of the two MBSSID elements. Lengths 434a, 434b provide the lengths of the two MBSSID elements. MaxBSSID indicators 436a, 436b provide the maximum number of supported BSSIDs. Subelement 438a provides the characteristics of a non-TX VAP corresponding to element ID 432a. Subelement 438a can include subelement ID 440a, length 442a, and data 444a. Subelement ID 440a provides the ID of subelement 438a. Length 442a provides the length of subelement 438a. Data 444a provides the characteristics of the non-TX VAP corresponding to element ID 432a. In this example, data 444a provides an inherited capability of the non-TX VAP, and the inherited capability is provided by the non-transmitted (non-TX) BSSID capability 446, SSID 448, and MaxBSSID index 450. In this example, subelement 438b provides the characteristics of a non-TX VAP corresponding to element ID 432b. Subelement 438b can include subelement ID 440b, length 442b, and data 444b. Subelement ID 440b provides the ID of subelement 438b. Length 442b provides the length of subelement 438b. Data 444b provides the characteristics of the non-TX VAP corresponding to element ID 432b. In this example, 444b provides a non-inherited capability of the non-TX VAP, and the non-inherited capability is provided in the non-inheritance element 352.

An MBSSID beacon can also include MBSSID config elements, such as MBSSID config element 460. As illustrated in FIG. 4B, MBSSID config element 460 can include element ID 462, length 464, element ID extension 466, BSSID count 468, and profile periodicity 470. Element ID 462 identifies an element to be configured by MBSSID config element 460. Length 464 provides the length of MBSSID config element 460. Element ID extension 466 provides additional elements to be configured, for example, if element ID 462 is set to 255. BSSID count 468 provides a total number of active BSSIDs in an MBSSID beacon. Profile periodicity 470 indicates a minimum number of beacon frames to discover all non-TX VAPs in an MBSSID beacon. For example, if profile periodicity 470 is set to four, then a client device can wait for at least four beacon intervals to fully receive an MBSSID beacon.

Figure 5:
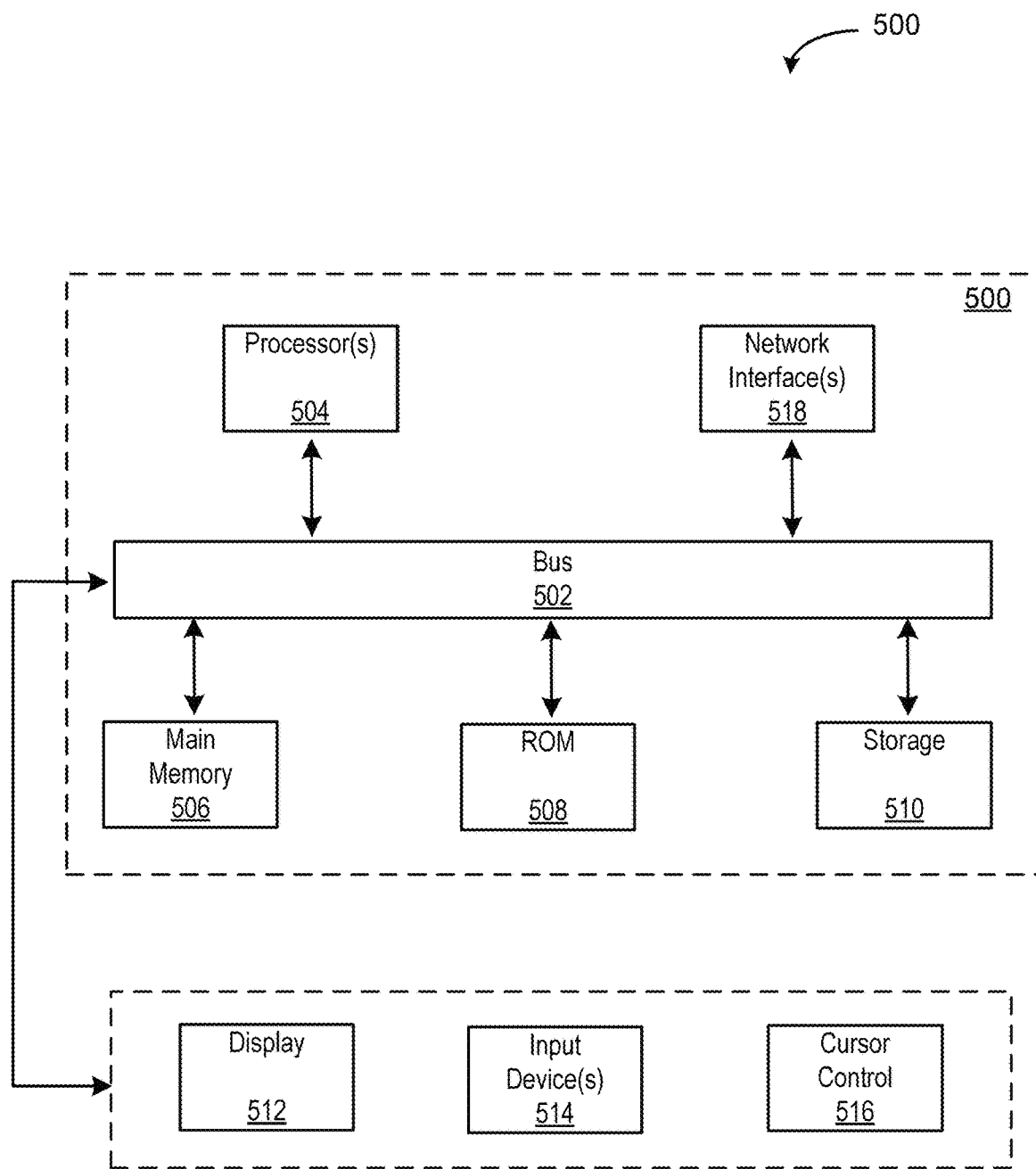
FIG. 5 is an example computing component that may be used to implement various features of embodiments described in the present disclosure.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic, or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local network and Internet both use electrical, electromagnetic, or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
    determining, by an access point (AP), characteristics of a set of virtual access points (VAPs) associated with the AP;
    generating, by the AP, a multiple basic service set identifier (MBSSID) VAP based on the characteristics of the set of VAPs, the MBSSID VAP comprising a non-communication-facilitating VAP;
    generating, by the AP, an MBSSID beacon based on the MBSSID VAP as a transmitted VAP (TX VAP) for the MBSSID beacon, the MBSSID beacon advertising the MBSSID VAP as a hidden SSID; and
    transmitting, by the AP, the MBSSID beacon.

2. The method of claim 1, further comprising:
    causing, by the AP, a change to be made to a VAP of the set of VAPs, wherein an MBSSID associated with the set of VAPs is uninterrupted during the change.

3. The method of claim 1, wherein determining characteristics of a set of VAPs associated with the AP comprises:
    determining radio specific characteristics associated with the AP.

4. The method of claim 1, wherein the MBSSID VAP is generated based on radio specific characteristics associated with the AP that are common to the set of VAPs.

5. The method of claim 1, wherein the MBSSID VAP is generated with the hidden SSID or the MBSSID VAP is generated with a nameless SSID of zero length.

6. The method of claim 1, wherein the MBSSID VAP is generated to only have characteristics that are common to all VAPs in the set of VAPs.

7. The method of claim 1, wherein the set of VAPs are non-transmitted VAPs (non-TX VAPs) for the MBSSID beacon.

8. The method of claim 1, further comprising:
    rejecting, by the AP, attempts to connect to the MBSSID VAP; or
    responding, by the AP, to attempts to connect to the MBSSID VAP with an authentication response carrying an error status.

9. A system, comprising:
    a processor; and
    a memory operatively connected to the processor, and including computer code that when executed, causes the system to:
        determine characteristics of a set of virtual access points (VAPs) associated with an access point (AP);
        generate a multiple basic service set identifier (MBSSID) VAP based on the characteristics of the set of VAPs, the MBSSID VAP comprising a non-communication-facilitating VAP;
        generate an MBSSID beacon based on the MBSSID VAP as a transmitted VAP (TX VAP) for the MBSSID beacon;
        transmit the MBSSID beacon, the MBSSID beacon advertising the MBSSID VAP as a hidden SSID; and
        cause a change to be made to a VAP of the set of VAPs, wherein an MBSSID associated with the set of VAPs is uninterrupted during the change.

10. The system of claim 9, wherein determining characteristics of a set of VAPs associated with the AP comprises:
    determining radio specific characteristics associated with the AP.

11. The system of claim 9, wherein the MBSSID VAP is generated based on radio specific characteristics associated with the AP that are common to the set of VAPs.

12. The system of claim 9, wherein the MBSSID VAP is generated with the hidden SSID or the MBSSID VAP is generated with a nameless SSID of zero length.

13. The system of claim 9, wherein the computer code further causes the system to:
    ignore unicast probe requests and broadcast probe requests associated with the MBSSID VAP.

14. The system of claim 9, wherein the computer code further causes the system to:
    reject attempts to connect to the MBSSID VAP; or
    respond to attempts to connect to the MBSSID VAP with an authentication response carrying an error status.

15. A non-transitory computer-readable storage medium including instructions that, when executed by at least one processor of a computing system, cause the computing system to:
    determine characteristics of a set of virtual access points (VAPs) associated with an access point (AP);
    generate a multiple basic service set identifier (MBSSID) VAP based on the characteristics of the set of VAPs, the MBSSID VAP comprising a non-communication-facilitating VAP;
    generate an MBSSID beacon based on the MBSSID VAP as a transmitted VAP (TX VAP) for the MBSSID beacon;
    transmit the MBSSID beacon, the MBSSID beacon advertising the MBSSID VAP as a hidden SSID; and
    reject attempts to connect to the MBSSID VAP.

16. The non-transitory computer-readable storage medium of claim 15, wherein the instructions further cause the computing system to:
    cause a change to be made to a VAP of the set of VAPs, wherein an MBSSID associated with the set of VAPs is uninterrupted during the change.

17. The non-transitory computer-readable storage medium of claim 15, wherein determining characteristics of a set of VAPs associated with the AP comprises:
    determining radio specific characteristics associated with the AP.

18. The non-transitory computer-readable storage medium of claim 15, wherein the MBSSID VAP is generated based on radio specific characteristics associated with the AP that are common to the set of VAPs.

19. The non-transitory computer-readable storage medium of claim 15, wherein the MBSSID VAP is generated with a hidden service set identifier (SSID) or the MBSSID VAP is generated with a nameless SSID of zero length.

20. The non-transitory computer-readable storage medium of claim 15, wherein the MBSSID VAP is generated to only have characteristics that are common to all VAPs in the set of VAPs.

* * * * *